(12) United States Patent
Mutalik et al.

(10) Patent No.: US 10,236,984 B2
(45) Date of Patent: Mar. 19, 2019

(54) MITIGATING NOISE AND OBI IN RFOG NETWORKS

(71) Applicant: ARRIS Enterprises LLC, Suwanee, GA (US)

(72) Inventors: Venkatesh G. Mutalik, Middletown, CT (US); Marcel F. Schemmann, Maria Hoop (NL)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/663,298

(22) Filed: Jul. 28, 2017

(65) Prior Publication Data
US 2017/0331556 A1 Nov. 16, 2017

Related U.S. Application Data

(63) Continuation of application No. 14/947,218, filed on Nov. 20, 2015, now Pat. No. 9,755,750, which is a
(Continued)

(51) Int. Cl.
*H04B 10/25* (2013.01)
*H04B 10/40* (2013.01)
(Continued)

(52) U.S. Cl.
CPC ......... *H04B 10/40* (2013.01); *H04B 10/2503* (2013.01); *H04B 10/2581* (2013.01); *H04B 10/25751* (2013.01); *H04B 10/64* (2013.01); *H04J 14/0247* (2013.01); *H04J 14/0252* (2013.01); *H04J 14/0282* (2013.01); *H04J 14/0298* (2013.01); *H04J 2014/0253* (2013.01)

(58) Field of Classification Search
None
See application file for complete search history.

(56) References Cited

U.S. PATENT DOCUMENTS 3,732,491 A 5/1973 Battista
5,099,114 A 3/1992 Matsumoto et al.
(Continued)

FOREIGN PATENT DOCUMENTS

EP 0853440 A2 7/1998

OTHER PUBLICATIONS

Extended European Search Report, RE: Application No. 11177058.2, dated Jun. 12, 2017.
(Continued)

*Primary Examiner* — Darren E Wolf
(74) *Attorney, Agent, or Firm* — Lori Anne D. Swanson

(57) ABSTRACT

A bi-directional optical transceiver includes multiple single mode optical ports and a multi-mode optical port. A multi-mode optical combiner combines single mode optical signals received at the single mode optical ports into a multi-mode optical signal at the multi-mode optical port. Each single mode optical signal has a distinct optical mode that does not interfere with the optical mode of the other single mode optical signals. A photo detector detects a total optical power of the plurality of single mode optical signals in the multi-mode optical signal. An amplifier is coupled to receive an output of the photo detector.

16 Claims, 17 Drawing Sheets

Related U.S. Application Data continuation of application No. 14/455,101, filed on Aug. 8, 2014, now Pat. No. 9,515,739, which is a continuation of application No. 13/151,257, filed on Jun. 1, 2011, now Pat. No. 8,837,953.

(60) Provisional application No. 61/320,896, filed on Apr. 5, 2010.

(51) Int. Cl.
*H04B 10/64* (2013.01)
*H04J 14/02* (2006.01)
*H04B 10/2575* (2013.01)
*H04B 10/2581* (2013.01)

(56) References Cited

U.S. PATENT DOCUMENTS

| | | | |
|---|---|---|---|
| 5,285,305 A | 2/1994 | Cohen et al. | |
| 5,684,801 A * | 11/1997 | Amitay | H04W 72/044 370/447 |
| 5,861,966 A | 1/1999 | Ortel | |
| 6,490,727 B1 | 12/2002 | Nazarathy et al. | |
| 6,753,960 B1 | 6/2004 | Polynkin et al. | |
| 6,870,152 B2 | 3/2005 | Ralph | |
| 7,826,702 B2 | 11/2010 | Dawes | |
| 8,559,816 B2 | 10/2013 | Zheng | |
| 8,837,953 B2 | 9/2014 | Mutalik et al. | |
| 2003/0007212 A1 * | 1/2003 | Sala | H04J 3/0608 398/99 |
| 2003/0095736 A1 | 5/2003 | Kish, Jr. et al. | |
| 2004/0028406 A1 | 2/2004 | Bortz et al. | |
| 2005/0147410 A1 | 7/2005 | Smith | |
| 2005/0254750 A1 | 11/2005 | Narevicius | |
| 2006/0171714 A1 | 8/2006 | Dove | |
| 2006/0277581 A1 * | 12/2006 | Eliyahu | H04N 5/76 725/88 |
| 2007/0046836 A1 | 3/2007 | Kim et al. | |
| 2007/0201868 A1 | 8/2007 | Aoki | |
| 2008/0069564 A1 | 3/2008 | Bernard | |
| 2010/0111118 A1 | 5/2010 | Seo et al. | |
| 2010/0189391 A1 | 7/2010 | Shimotsu | |
| 2010/0329671 A1 | 12/2010 | Essiambre et al. | |
| 2011/0064444 A1 * | 3/2011 | Adachi | G03G 15/80 399/69 |
| 2012/0148241 A1 | 6/2012 | Piehler et al. | |
| 2012/0195600 A1 | 8/2012 | Winzer | |
| 2014/0099120 A1 | 4/2014 | Sorin et al. | |
| 2014/0348511 A1 | 11/2014 | Mutalik et al. | |
| 2015/0125153 A1 * | 5/2015 | Lee | H04B 10/0793 398/79 |

OTHER PUBLICATIONS

L. Stuart, "SCTE Canadian Summit: RFoG deployments offer clear advantages for cablecos", CARTT, Mar. 10, 2010, 3 pgs.

O. Sniezko, "RFoG: Overcoming the Forward and Reverse Capacity Constraints", Aurora Networks, Inc., 2011, 15 pgs.

D. Russell, " Lessons learned from RFoG deployments", CED Magazine, Apr. 30, 2010 retrieved from the Internet at <http://www.cedmagazine.com/articles/2010/04/lessons-learned-from-rfog-deployments>, on Apr. 6, 2015.

H. Roberts, "RFoG Intelligent Micronode: The Advantages of an "Intelligent" Micronode", Calix, SCTE Cable-Tec Expo Oct. 2009, 16 pgs.

O. Sniezko, "RFoG—How to Make it Work and How to Expand it", Aurora Networks, SCTE Emerging Technologies Conference, Apr. 2009, 20 pgs.

Documents and Minutes of SCTE IPS WG5 IPS910 (RFoG Standards Working Group), Society of Cable and Telecommunications Engineers, Interface Practices Subcommittee, Oct. 21, 2008.

Non-Provisional U.S. Appl. No. 12/708,072, entitled "CMTS Scheduling for Mixed RFoG and HFC Networks", by Carol Ansley and Mike Emmendorfer, filed Feb. 18, 2010.

* cited by examiner

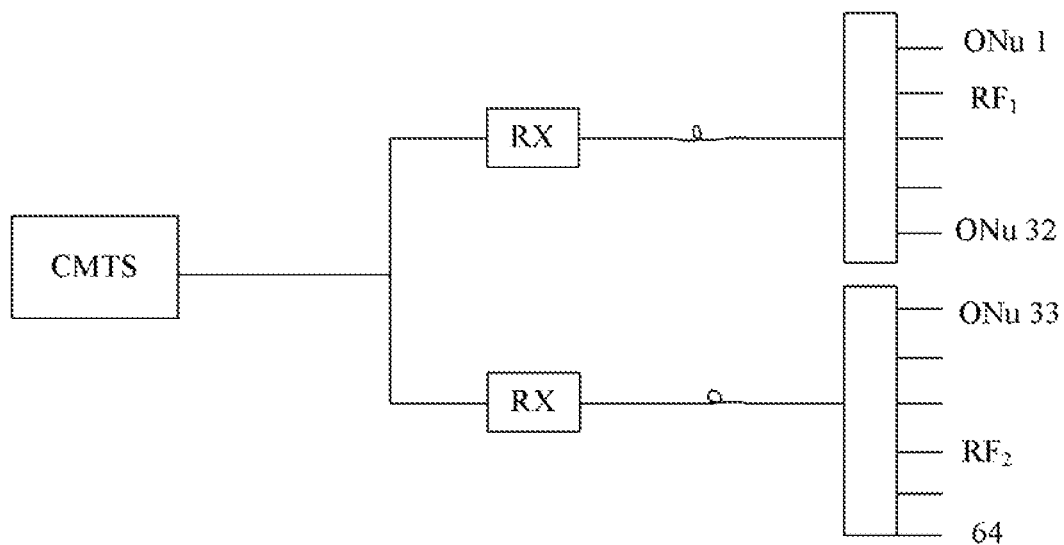
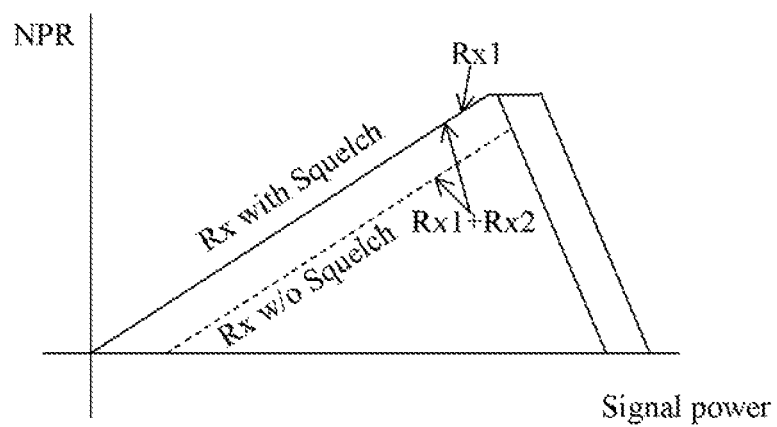
FIG. 3

MITIGATING NOISE AND OBI IN RFOG NETWORKS

CROSS-REFERENCE TO RELATED APPLICATIONS

This application is a continuation of U.S. Pat. No. 9,755,750 filed as application Ser. No. 14/947,218, filed on Nov. 20, 2015 and issued on Sep. 5, 2017, which is a continuation of U.S. Pat. No. 9,515,739 filed as application Ser. No. 14/455,101 on Aug. 8, 2014 and issued on Dec. 6, 2016, which is a continuation of U.S. Pat. No. 8837953 filed as application Ser. No. 13/151,257 on Jun. 1, 2011 and issued on Sep. 16, 2014, which claims priority to U.S. Provisional Application No. 61/320,896 filed on Apr. 5, 2010 the contents of each incorporated herein by reference in its entirety.

BACKGROUND

Optical signal sources have a significant phase noise. When two optical sources are combined, an additional signal is produced in a noise band around a center frequency, (w1-w2). If the frequency range of this unwanted signal band overlaps with wanted signals, the signal to noise ratio of the wanted signal may be severely impacted. This is called optical beat interference (OBI) and is a practical problem, particularly in cable television (CATV) return systems, where multiple optical signals are combined on a single detector.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIG. 3 in an illustration of an exemplary application of low squelch in a system with two reduced size receiver groups of thirty two consumer devices apiece.

FIG. 18 illustrates an exemplary system in which an SOA at the return transmitter is driven by a pre-distorted signal to compensate for non-linearity.

DETAILED DESCRIPTION

Figure 1:
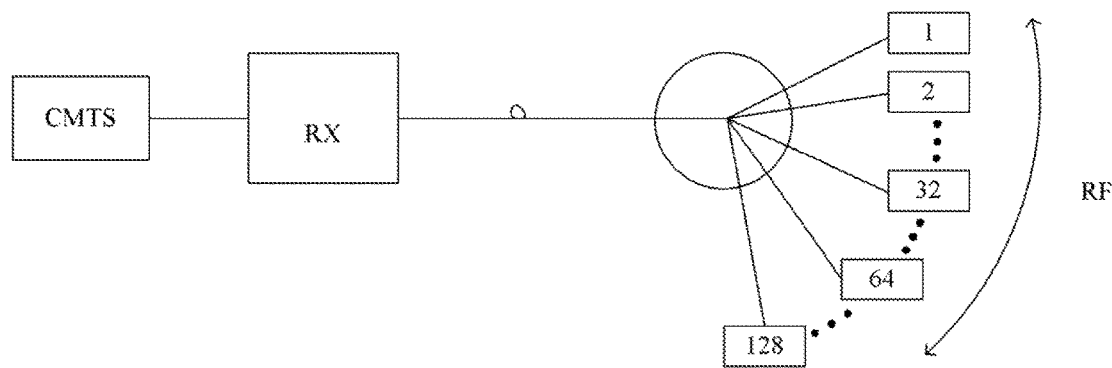
FIG. 1 is an illustration of an embodiment of a conventional RF communication system.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to machine memories (e.g., memory circuits or magnetic or optical media) and/or circuits comprising control/procedural signals, and/or settings and values, that may be applied to influence the operation of a device. Magnetic media, random access memory chips (both volatile and nonvolatile), electronic and optical circuits, electrical and optical memory (both volatile and nonvolatile), and firmware are examples of logic physical structure. In general, logic may comprise combinations of software (embodied in machine readable media and/or memories), hardware circuits, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic is a design decision that will vary according to implementation.

Noise Reduction and OBI Mitigation Techniques

Described herein are various techniques to reduce noise, and particularly OBI, in optical RF communication systems. The described techniques include:
1. OBI Mitigation Techniques
2. Optical Combining
3. RF Combining
4. RF Combining with Lo Squelch
5. RF Combining with Hi Squelch
6. RF Combining with High and Lo Squelch
7. Multimode Optical Combining
8. OBI Homogenization
9. Super Luminescent Laser Diodes as the light source
10. Highly coherent lasers to minimize interaction
11. High line width, high chirp lasers to minimize the effects of OBI
12. By a deliberately high OMI on a single channel
13. Use of high line width FP lasers
14. Use of a broadband source with a reflective amplifier The following is a summary of communication techniques in an RFoG system, and their effect on RF noise and OBI.
1. Optical Combining: Combining 256 ONUs optically
   No additional RF Noise at the receiver; regular occurrence of OBI.
2. RF Combining: Combining eight sets of 32 cluster ONUs
   Additional RF noise in the reverse transmission receiver; less occurrence of OBI than in (1)
3. RF Combining with Lo Squelch
   Less additional RF noise in the receiver than (2); less occurrence of OBI than (1) or (2)
4. RF Combining with Hi Squelch
   Additional noise in the receiver; less occurrence of OBI than (1)
5. RF Combining with High and Lo Squelch
   Less additional noise in the receiver than (4); less occurrence of the OBI than (4)
6. Multimode Optical Combining
   No Additional Noise in the Receiver; lesser occurrence of OBI than (1)

RFoG Low Squelch

FIG. 1 is an illustration of an embodiment of a conventional RF communication system. A large group of end user devices, in this example 128, communicates information in a reverse direction to a cable modem termination system (CMTS). The signals from all 128 end user devices in the return direction are combined and communicated to a reverse receiver and from there to the CMTS.

Figure 2:
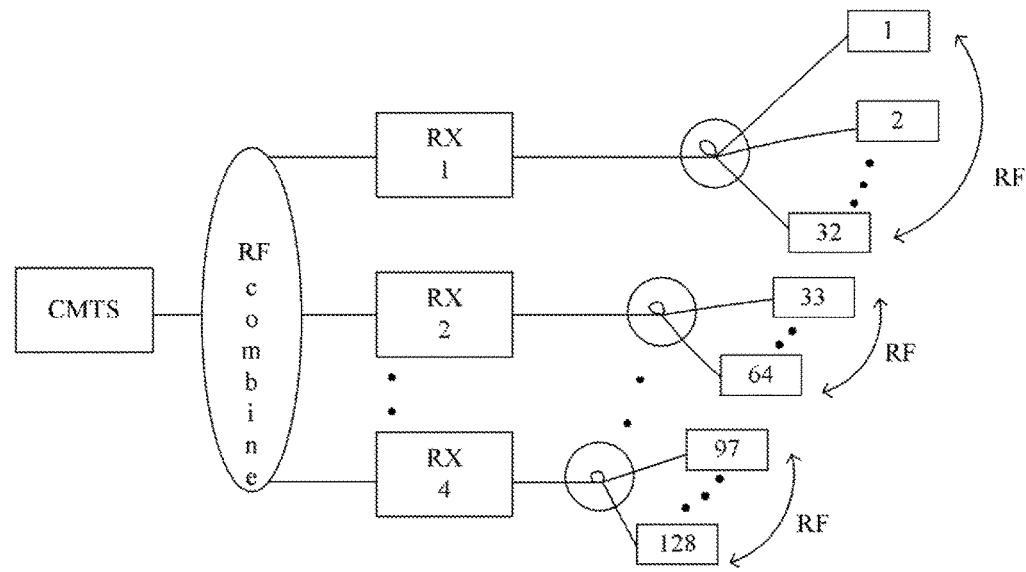
FIG. 2 is an illustration of an exemplary RF communication system with reduced RF noise in the reverse communication path.

FIG. 2 is an illustration of an RF communication system with reduced RF noise in the reverse communication path. End user equipment is arranged into smaller groupings, in this case thirty-two units per group, and return signals from each group are combined. Communications from each group in the reverse direction are combined and provided to a return receiver for the group.

Communications from the return receivers are combined upstream from the receivers before being provided to the CMTS. In one embodiment, a low squelch feature is applied at each individual receiver in a system such as illustrated in FIG. 2. The low squelch feature is activated when the combined signal power at the receiver indicates a quiescence state for the subscriber devices in the communication group. A quiescence state is not the same as no signal power, because there will be some noise signal power at the receiver for the group even when none of the consumer devices are transmitting upstream information. However, when the power profile indicates that all devices in the group are in quiescence in terms of communicating information in the reverse path, the receiver shuts off its output to the RF combiner, producing no signal power to the combiner. Without the low squelch feature, the receiver would be communicating some signal power to the RF combiner even though none of the consumer device transmitters in its group are communicating upstream information. This quiescence signal power provided by the receiver to the RF combiner results in noise on the reverse path even when there is no actual communication of upstream information by consumer device transmitters in the group.

FIG. 3 in an illustration of the application of low squelch in a system with two reduced size receiver groups of thirty two consumer devices apiece. Each consumer device group includes both optical networking units and devices which communicate via RF over coaxial cable. The graphic at the bottom of the figure shows results of applying a low squelch to the two return receivers for the two consumer device groups. The NPR (Noise Power Ratio, a measure proportional to the signal to noise ratio available in the channel) is shown on the Y axis as a function of signal power on the X-axis. With low-squelch the noise of the two receivers does not add up resulting in an improved signal to noise ratio. At high signal power the signal to noise ratio is reduced due to distortion in the transmission channel, this is not affected by the low-squelch.

Figure 4:
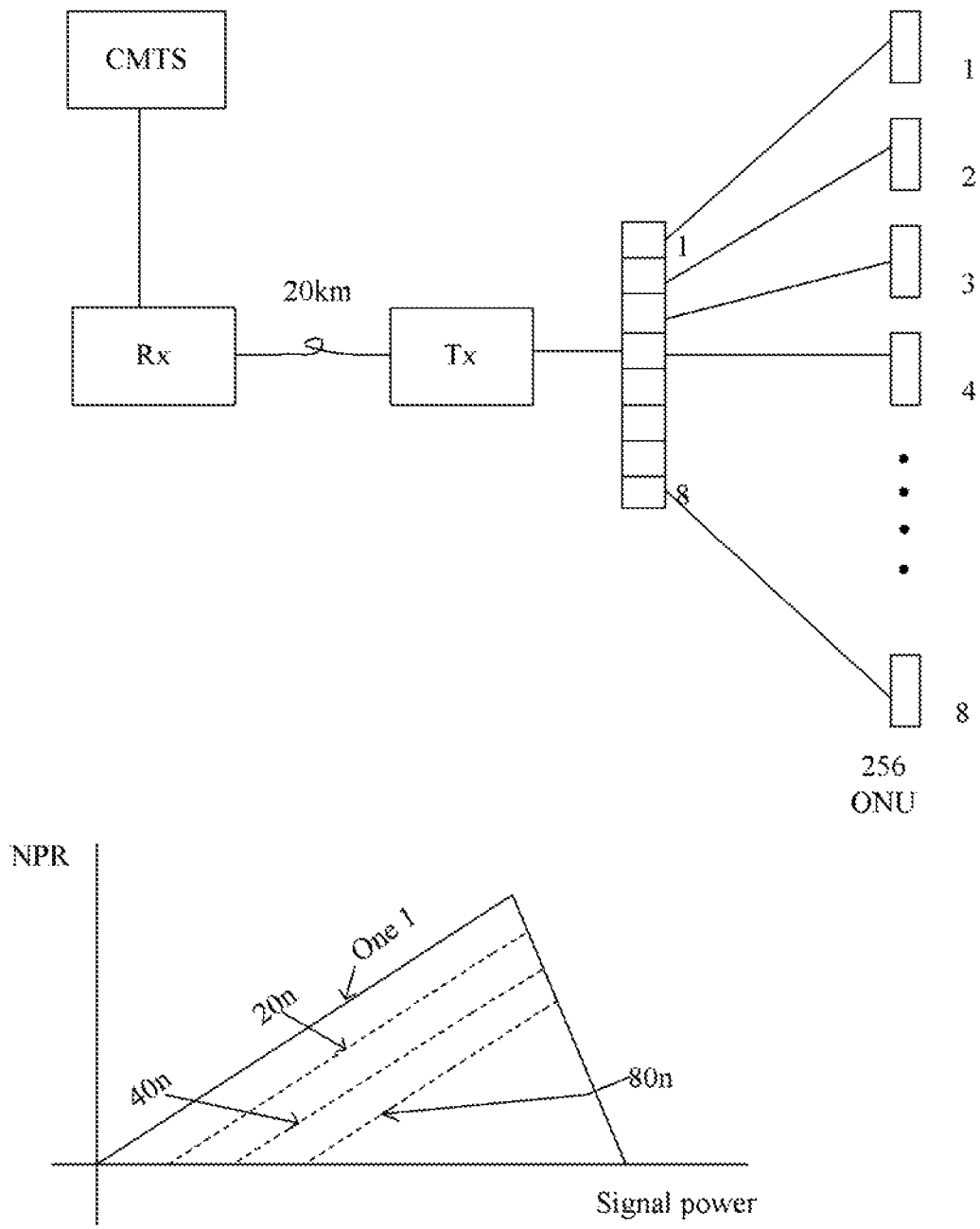
FIG. 4 is an illustration showing an example of the application of low squelch for a larger number of consumer device groups, in this case eights groups, each comprising thirty-two transmitting devices.

FIG. 4 is an illustration of an embodiment showing the application of low squelch for a larger number of consumer device groups, in this case eights groups, each comprising thirty-two transmitting devices. The consumer devices comprise return transmitters that are optically combined in groups of 32 each and provided to optical receivers 1.8 located, for instance, in a hub or in a node. Each of these receivers comprises a low-squelch circuit such that output is quiet when their input is idle. The combined output of these receivers is provided to a transmitter. The transmitter then sends the signals back to the headend via a fiber (for instance 20 km) and the signals are received at a receiver which provides RF signals to a CMTS (Cable Modem Termination System).

Figure 5:
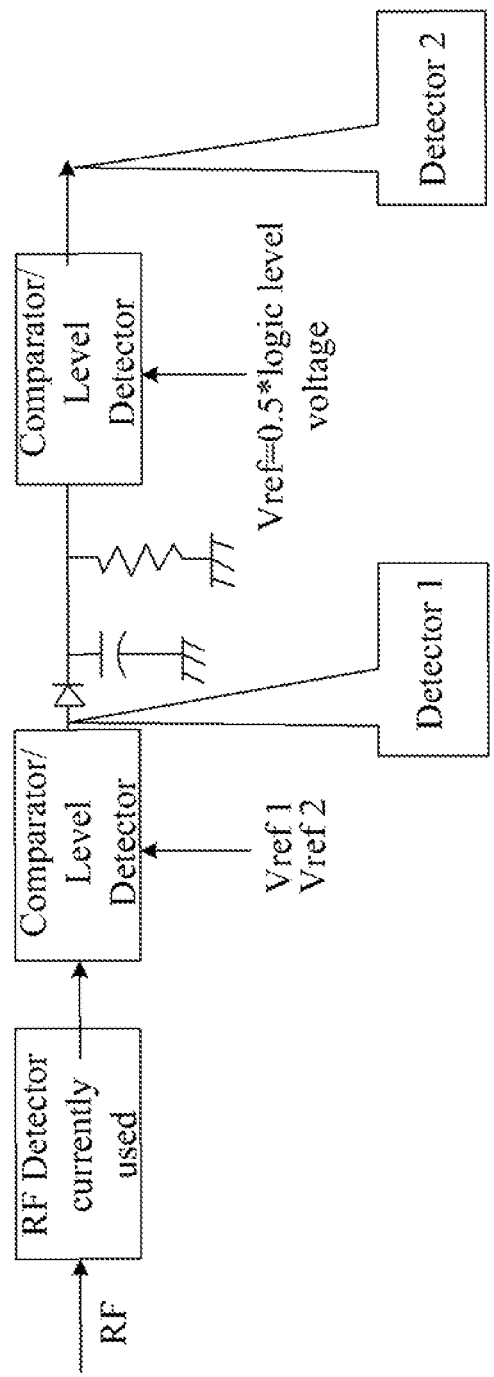
FIG. 5 is an illustration of an embodiment of low-squelch logic.

FIG. 5 is an illustration of an embodiment of low-squelch logic. The output of a return RF receiver is ON if Detector 1 OR Detector 2 outputs HIGH. The output of a return RF receiver is OFF (squelched) if Detector 1 AND Detector 2 outputs LOW. In one embodiment, an RC time constant (see FIG. 5) is 5 us, which determines the quiescent time that will result in Rx output squelch.

Overview of Hi Squelch Techniques

A hi squelch feature to disable an upstream (reverse transmitter) output may be is implemented in various ways. For example, hi squelch may be implemented using RF detection in a non-communication band. A high pass filter is located in front of a reverse path (upstream) RF detector in a reverse receiver. If the RF detector detects RF signals, hi squelch is put into effect, and the receiver output is disabled.

Hi squelch may be implemented using optical power and RF power relationships. RF power is received in proportion to the optical power received. When multiple transmitters are transmitting to the same optical receiver at the same time, the optical power at the receiver is increased and the total received RF power is increased in proportion. In a well balanced system, when two transmitters transmit at the same time, the optical power at the receiver is increased by 3 dB and the RF power is also increased by 3 dB at the detector when there is no OBI. When the OBI occurs, the amount of RF power received is in excess of the optical power incident on the receiver. In one embodiment this mismatch triggers hi squelch. False positives may occur when consumer devices (e.g. cable modems) are ranging or when a cable plant experiences ingress. If there is high or unexplained increase in RF power without any commensurate increase in optical power, the changes are attributed to ingress or cable modem ranging and not symptomatic of the OBI. Therefore in some applications hi squelch is not put into effect in this circumstance.

A combination of these two techniques yields accurate hi squelch operation, where the squelch reaction time may be similar to the squelch reaction time for lo squelch operation (e.g. 5 microseconds in some embodiments).

Hi squelch effect may vary as a function of the number of independent reverse communication channels. The effect of hi squelch becomes more important as the number of independent RF reverse channels increases. It is estimated that the benefit of a hi squelch in an always ON eight channel system is an up to four times reduction of OBI events and in a comparable four channel system, the improvement is around a two times reduction in OBI.

OBI homogenization is a technique to smooth the effects of OBI occurrence at the customer devices. When OBI occurs in a cluster of ONU, the OBI occurrence can be absent for prolonged periods of time and then occur during prolonged periods of time as return transmitter wavelengths slowly drift as a function of temperature. Thus even if the average rate of OBI occurrence is low, when it occurs it can occur over a prolonged period of time. This is referred to as "lumpy". OBI lumpiness results when there are two lasers transmitting at wavelengths very close to each other. This lumpiness degrades customer experience as it does not simply slightly reduce data throughput, it may substantially eliminate data throughput for noticeable amounts of time. One way to decrease the lumpiness and generate homogeneity in the OBI is to have the wavelengths of the ONUs vary deliberately so that no two combinations of the ONUs experience excessive OBI. This is achieved by making sure that an ONU uses a different wavelength setting whenever it turns on, by a continuous changing of the wavelength at rest or while bursting. These homogenizing techniques result in a more equitable distribution of the OBI, and not an elimination of OBI in general.

Another manner of homogenizing OBI is to set up multiple bias current states around the nominal bias current state. For example, if the laser is operating at 70 mA above threshold, set up five states +/−5% away from the 70 mA and +/−10% away from the 70 mA: states of 63, 66.5, 70, 73.5, 77 mA. The laser generally moves at 1 GHz/mA so the laser wavelength is now spread over +/−7 GHz, enough to induce a homogeneity in OBI. Another homogenizing technique is to set up a change in the laser temperature thru a proximately placed resistor over +/−5 C with a slow slew rate. The laser wavelength varies by 0.1 nm/C resulting in effectively homogenizing the OBI occurrence.

OBI Mitigation In RFoG Systems

One approach to OBI mitigation involves allocating transmitter wavelengths such that OBI is reduced or eliminated. Another technique involves controlling the nature of the transmitter output spectrum such that the effect of OBI is reduced or eliminated.

Figure 6:
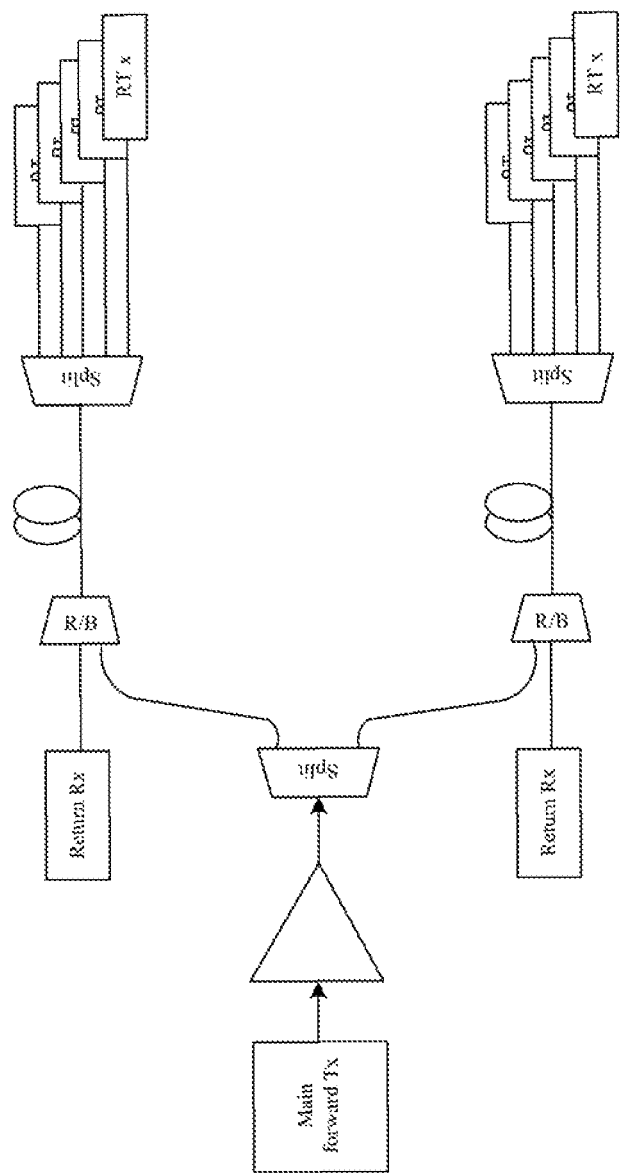
FIG. 6 illustrates an exemplary system for communicating radio frequency data signals over an optical physical transmission path, e.g. RFoG data communication system.

FIG. 6 illustrates an exemplary system for communicating radio frequency data signals over optical physical transmission path, e.g. RFoG data communication system. A main forward transmitter provides an optical signal to an amplifier (e.g. an erbium fiber doped amplifier EFDA) that has multiple outputs from a splitter. Each splitter output goes to a red/blue (RB) combiner/splitter that combines the forward signals onto a fiber that also carriers return signals. Typically the forward optical signal is in the 1550 nm range and the return optical signal is in the 1310 nm range or at other wavelength ranges. The return signals are received by return receivers, one for each group of users. The fiber is provided to a splitter that distributes the forward optical receivers to the end users (RTx), which each comprise a receiver for the forward wavelength and a transmitter for the return wavelength. The transmitters provide return signals. When multiple transmitters are on at the same time, OBI events can take place when transmitter wavelengths coincide.

Automatic Wavelength Allocation

One OBI mitigation technique applies a return receiver to detect that an OBI event has occurred. The receiver detects an RF spectrum that extends beyond a predetermined frequency band, indicating an OBI event.

Figure 7:
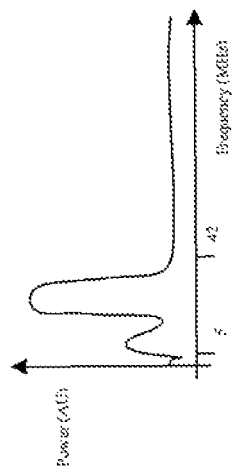
FIG. 7 illustrates a power verses frequency distribution at an exemplary return receiver in an RFoG communication system without the presence of unacceptable OBI.

FIG. 7 illustrates a power verses frequency distribution at a return receiver in an RFoG communication system without the presence of unacceptable OBI. The power of the return signal are confined to band of, for instance, 5-42 MHz.

Figure 8:
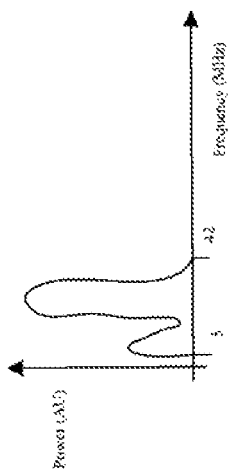
FIG. 8 illustrates a power verses frequency distribution at an exemplary return receiver for return signals comprising a significant amount of OBI.

FIG. 8 illustrates a power verses frequency distribution at a return receiver for return signals comprising a significant amount of OBI. OBI appears as a wideband signal exceeding several 100 MHz and comprises a significant amount of signal power outside the return band.

Logic of the return receiver monitors the spectrum of the return signals to determine if an OBI event has occurred. When significant power is detected outside of an expected frequency range, it determines that an OBI event has occurred. The receiver may also detect an OBI event by monitoring the average RF power. In many OBI events, the average power exceeds normal power levels such that an OBI event may be detected by setting a threshold at a power detector. A hi-squelch activator and/or out of band power detector may be applied to squelch the receiver output when an OBI event occurs.

OBI detection may be based on average power, although preferably it is based on detecting power outside the signal frequency band. The latter detection method may be more sensitive to OBI events when the OBI noise power is significantly below the signal power, such that the OBI cannot easily be detected as an increase in average power but the OBI already affects the signal to noise ratio.

When the receiver detects and OBI event, it may signal the return transmitters via a forward communication. It may have a transmitter built in to provide this forward communication, or another part of the system may provide this forward communication.

Figure 9:
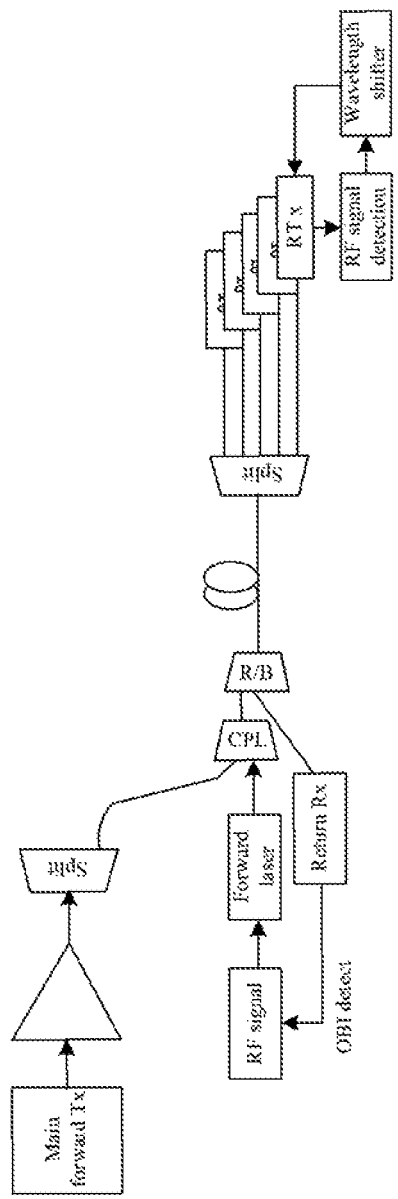
FIG. 9 illustrates an RFoG system in which an exemplary return receiver determines if an OBI event has occurred and provides an OBI detection signal to an RF signal generator that modulates a forward path laser.

FIG. 9 illustrates an RFoG system in which a return receiver determines if an OBI event has occurred and provides an OBI detection signal to an RF signal generator that modulates a forward path laser. The RF signal generator modulates a laser which is added into the forward path with a coupler CPL. The signal is received by the end users (RTx). An RTx detects the RF signal for OBI occurrences and controls a wavelength shifter for the return lasers.

The signal provided to the return transmitters may, for example, indicate that an OBI event has occurred, and furthermore indicate a group id for the receivers receiving those transmitters, and/or instruct a return transmitter to change its wavelength to a particular value.

In one embodiment, a system component (e.g., the return receiver) has knowledge of the transmitters in the system, and their status. The RFoG system may provide two-way communication between return transmitters and return receivers. This may be done using low-cost RF transmitters. In one embodiment, the message that an OBI event has occurred is not directed at any particular return transmitter. When the return transmitters receive this message they may respond, for instance by shifting their wavelength, or they may not respond. Transmitters that were not active in a time interval that could have contributed to the OBI event do not respond, because the OBI event is not related to their activity. Transmitters active in the relevant interval before the OBI event may respond by shifting their wavelength. At least two transmitters must be active to produce an OBI event; thus the detection signal may result in at least two transmitters shifting wavelength, where only one needed to shift wavelength to prevent a next collision between those two transmitters. In one embodiment, not all involved transmitters shift wavelength at each detected OBI event.

Figure 10:
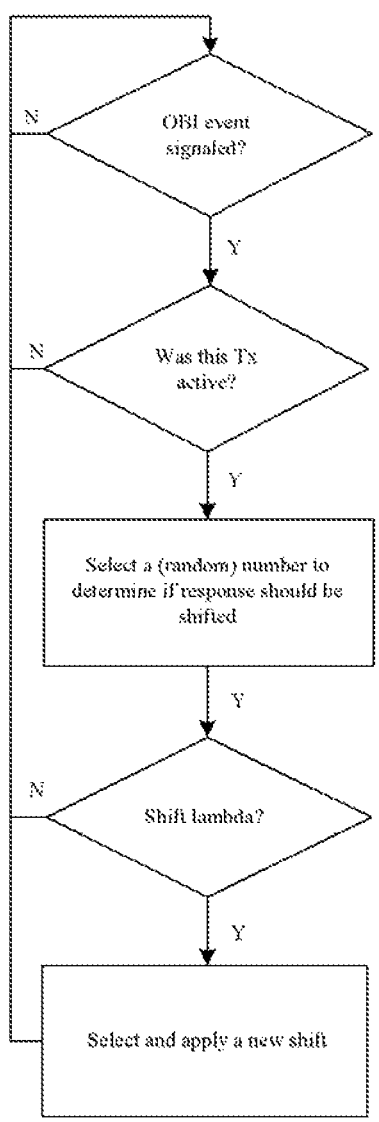
FIG. 10 is an illustration of an embodiment of logic flow for a transmitter determining whether or not to make a wavelength shift in response to an OBI event.
Figure 11:
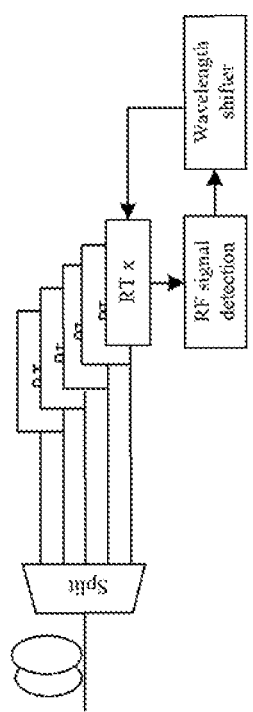
FIG. 11 is an illustration of an embodiment of a system to make a wavelength shift in response to an OBI event.

FIG. 10 is an illustration of an embodiment of logic flow for a return transmitter determining whether or not to make a wavelength shift in response to an OBI event. The logic may be carried out by a customer device RTx such as the exemplary one illustrated in FIG. 11. The transmitter response may depend upon its previous activity, and on a random selection of whether to respond or not. The magnitude of the transmitter response in terms of wavelength shift may be deterministic (such as cycling through available wavelengths), or random, by picking a new wavelength shift. To maintain a low-cost for the return transmitters, accurate wavelength control may not be employed. Instead, thermal control of the lasers may be applied to offset the laser wavelength in a limited range. Instead of controlling the wavelength, an amount of offset may be controlled. Environment temperature also causes laser wavelengths to shift. Environmentally induced wavelength shift may be compensated for, or just ignored. If ignored, the resulting wavelength drift of the laser may result in renewed OBI events with other sources. The system reduces the occurrence of these renewed OBI events by automatic re-distribution of wavelengths when the OBI events occur, keeping the rate of OBI events near zero at all times.

Figure 12:
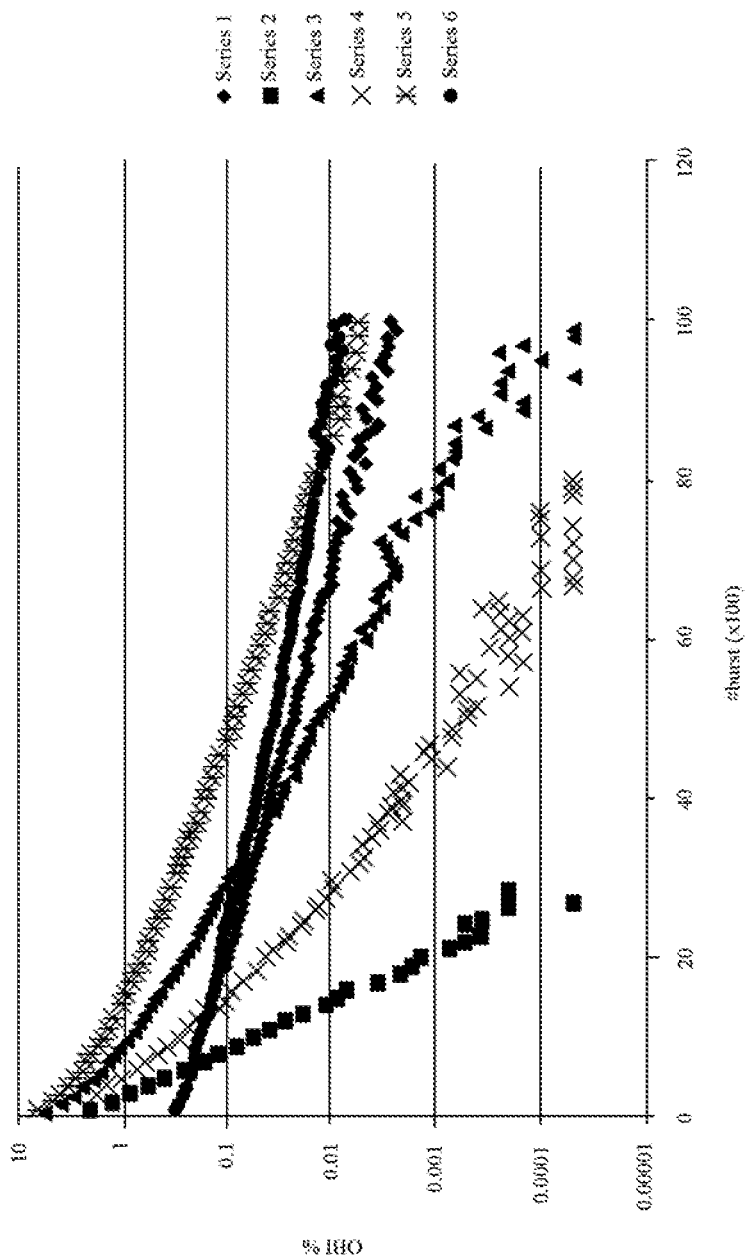
FIG. 12 illustrates an example of simulated OBI occurrences for different parameters such as channel activity, number of users, and group sizes.

FIG. 12 illustrates an example of simulated OBI occurrences for different parameters such as channel activity, number of users, and group sizes. FIG. 12 shows how the rate of OBI occurrences drops exponentially in time until no OBI at all occurs any longer. When any wavelength has drifted significantly, the OBI increases again to a low level, then decays again to zero. Temporary OBI occurrence rates under 1% typically do not impact system performance significantly.

The signal provided to the return transmitters may be an RF signal modulated onto a forward laser that is combined with the forward optical signal from upstream that carries programming, data, voice, and so on. The return receivers may be co-located with the return transmitters. A forward laser may be installed in each return receiver, or one central forward laser may be shared by many return receivers. With a shared forward laser, an OBI event in any return receiver group may lead to un-necessary transmitter wavelength shifts in other return receiver groups, making it more difficult for each group to stabilize to an OBI free wavelength allocation. The rate of convergence to a stable allocation depends on statistics of use and how the return transmitters respond to the OBI event signaling.

A return receiver may embed its ID in the OBI event signaling to the return transmitters.

The return transmitters may make their response to the OBI event dependent on that ID. Unnecessary wavelength shifts may thus be avoided and the system made more stable. Return transmitters may acquire the ID of the return receiver that they are coupled to in various ways. For example, they may be configured with this ID upon installation. They may be trained to this ID after installation. The first example is susceptible to installation errors. The second example prevents such errors but may require system interruption to re-train the system IDs when new return transmitters are added. A third option is to let the return transmitters learn their group ID automatically from the forward signals. An OBI event is detected and the signal is provided to the return transmitters. In most cases there are not multiple OBI events in different groups that occur at the same time. The transmitters recently active are the only transmitters that respond to the OBI event, and these transmitters read the group ID in the OBI event. That group ID is mostly applicable for the transmitters in question. The transmitters thus keep track of the group ID associated with OBI event signals and decide what group they belong to based on the majority of the ID's that correlate to their activity. This self-discovery may be enhanced by defining another forward signal; this signal may indicate a return receiver has detected activity in its group. The receiver may generate a confirmation signal carrying its ID, transmitted at a time that does not collide with such a confirmation signal from another return receiver. All the return transmitters frequently receive such confirmation signals whenever they are active, speeding their ability to discover what group they belong to.

Figure 13:
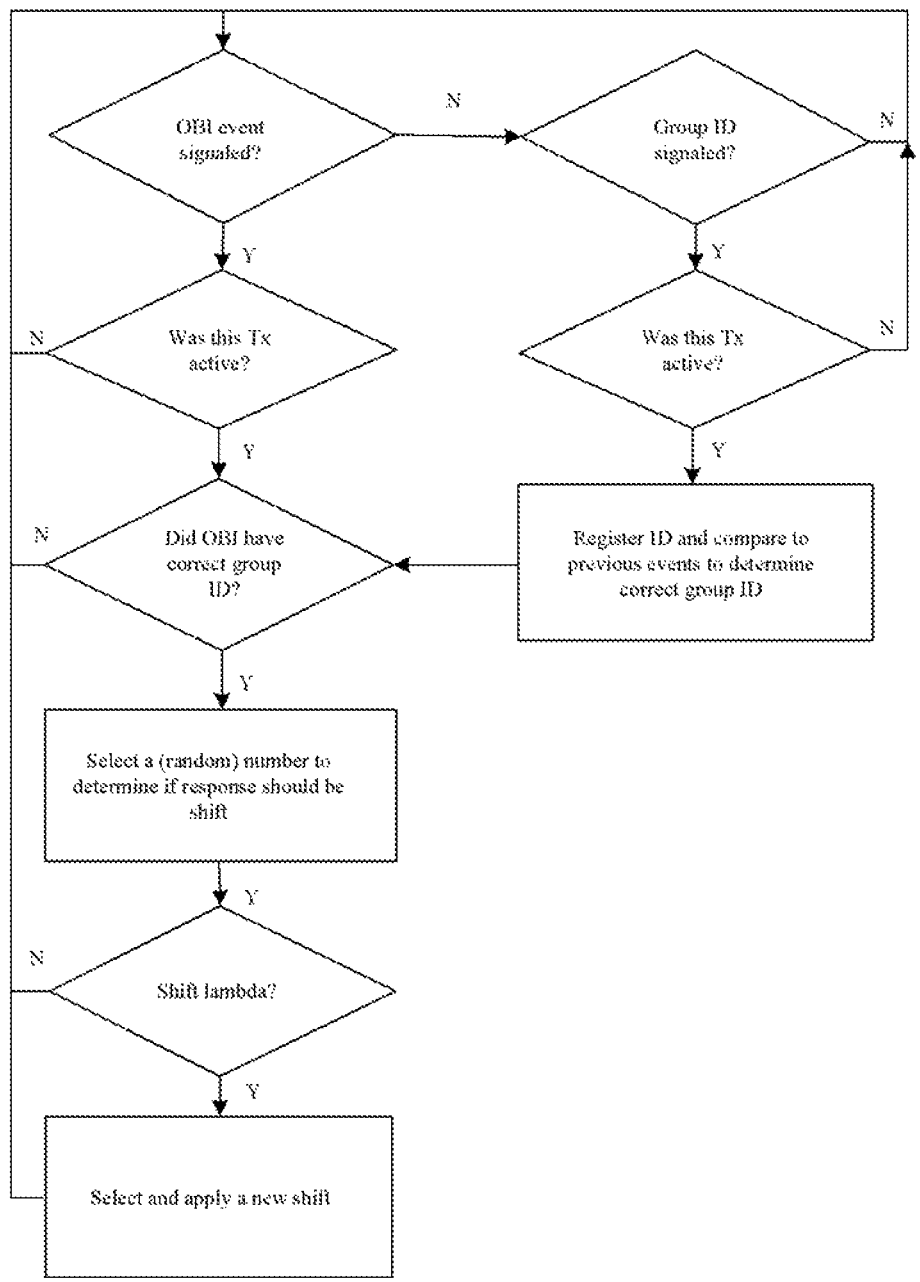
FIG. 13 illustrates an embodiment of logic flow, by way of which return transmitters learn their associated group ID.

FIG. 13 illustrates an embodiment of logic flow, by way of which return transmitters learn their associated group ID.

Figure 14:
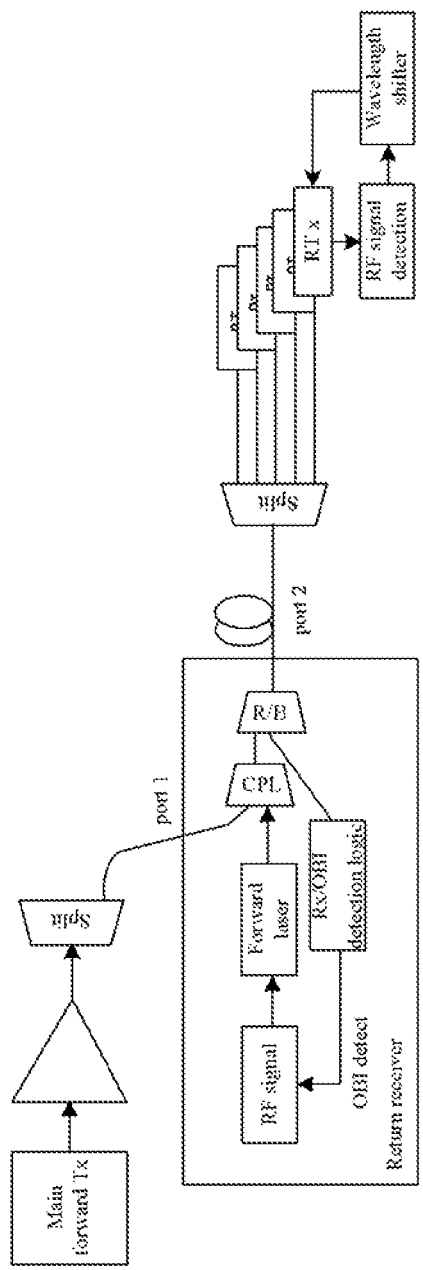
FIG. 14 illustrates an example of how forward signal injection may be accomplished in the return receiver itself.
Figure 15:
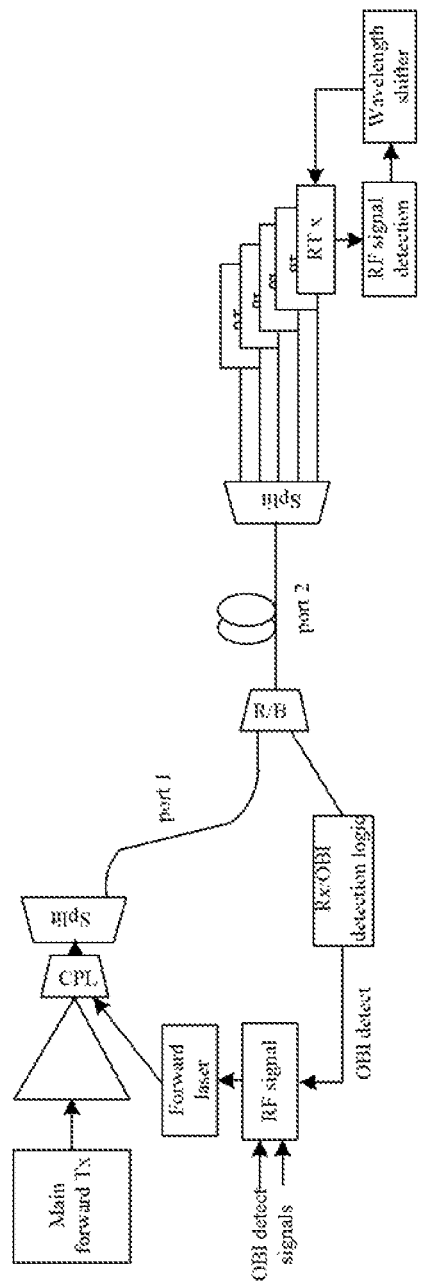
FIG. 15 illustrates an embodiment in which the OBI detection signal is injected into a main forward signal before the main forward signal is distributed over different return receiver groups.
Figure 16:
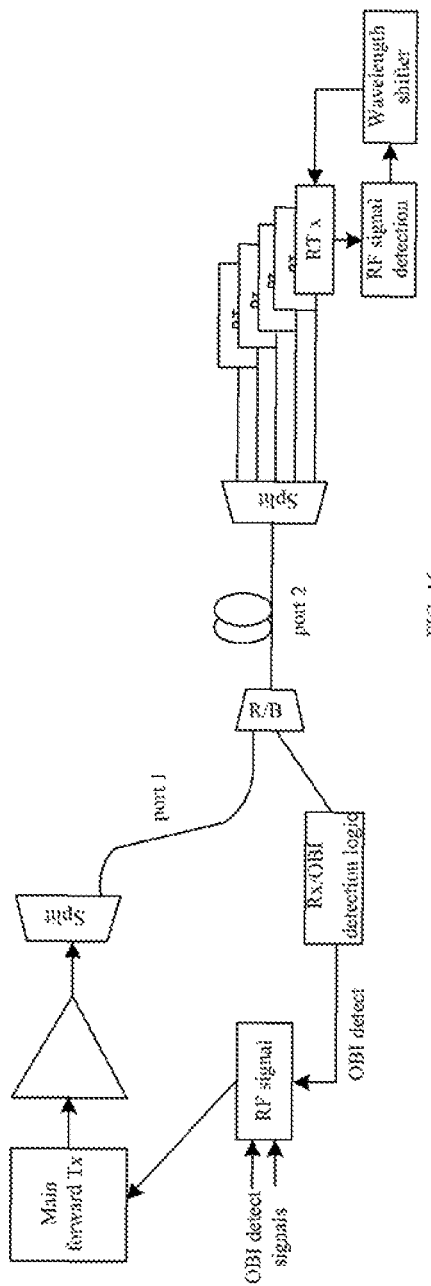
FIG. 16 illustrates an embodiment in which the OBI forward signal is provided as an RF signal to a forward optical transmitter that is providing the main forward signals of the RFoG system.

FIG. 14 illustrates an example of how forward signal injection may be accomplished in the return receiver itself. FIG. 15 illustrates an embodiment in which the OBI detection signal is injected into a main forward signal before the main forward signal is distributed over different return receiver groups. FIG. 16 illustrates an embodiment in which the OBI forward signal is provided as an RF signal to a forward optical transmitter that is providing the main forward signals of the RFoG system.

The forward signal injection may be implemented in different ways. One technique (FIG. 14) involves injection in the return receiver itself. The fiber to a group of homes may be coupled to a return receiver optical port. The receiver comprises a red-blue combiner to separate the forward and return wavelengths. It has a second optical port for input of the forward wavelength, typically 1550 nm. It also incorporates a low-power forward DFB laser that is coupled into the forward path. A WDM coupler may be used when the wavelength of the DFB laser is sufficiently different from the main forward path wavelength, or a regular coupler may be used when these wavelengths are close. A regular coupler is selected to have a low loss on the main forward path and a high loss for the local DFB laser. The wavelength of the local DFB laser may be chosen sufficiently different from the main forward path wavelength to prevent OBI between these forward signals. A high loss on the forward laser, even a low power laser, is acceptable because the forward signal from the return receiver only carries a single channel with a low data rate. Thus a very low signal power is sufficient to detect the injected forward signal. One advantage of this implementation is simplicity; it does not require communication between return receiver and other components in the head end.

In another implementation (FIG. 15) the forward signal indicating OBI detection is injected in the main forward signal before the main forward signal is distributed over the different return receiver groups. This involves fewer forward DFB lasers. It also involves communication between the return receivers and the forward DFB laser, which may be housed in a separate transmitter unit. That transmitter unit may comprise two optical ports, an input for the main forward optical signal and an output for the combined main forward signal and DFB. It may also comprise more optical ports in case this function is combined with an optical combiner/splitter.

In a third implementation a forward OBI detection signal is provided as an RF signal to a forward optical transmitter that is also providing the main forward signals of the RFoG system (FIG. 16). The forward OBI detection signal is distributed over a large number of return receiver groups and group IDs gain importance. This implementation may require more time to settle to OBI-free operation across all groups, but it also may provide the lowest cost. This implementation may include a central unit that collects all OBI and activity detection signals from the different return receivers and creates the forward signals.

When two-way communication is used, the return transmitters may embed information about status and history into the return signal that may be coupled at the headend or hub to create lookup tables and wavelength allocation plans. This information may be embedded upon request or at (optionally randomly) spaced time intervals. In the case of malicious use of return transmitters to create OBI interference, this information may be used to shut down certain return transmitters. The return transmitters may also request confirmation signals to be embedded in the forward path to determine what return receiver group they belong to. The status information provided by the return transmitters may include the amount of wavelength shift applied and the actual operating temperature. A central processing unit may use this information to derive optimum wavelength shift settings.

Figure 17:
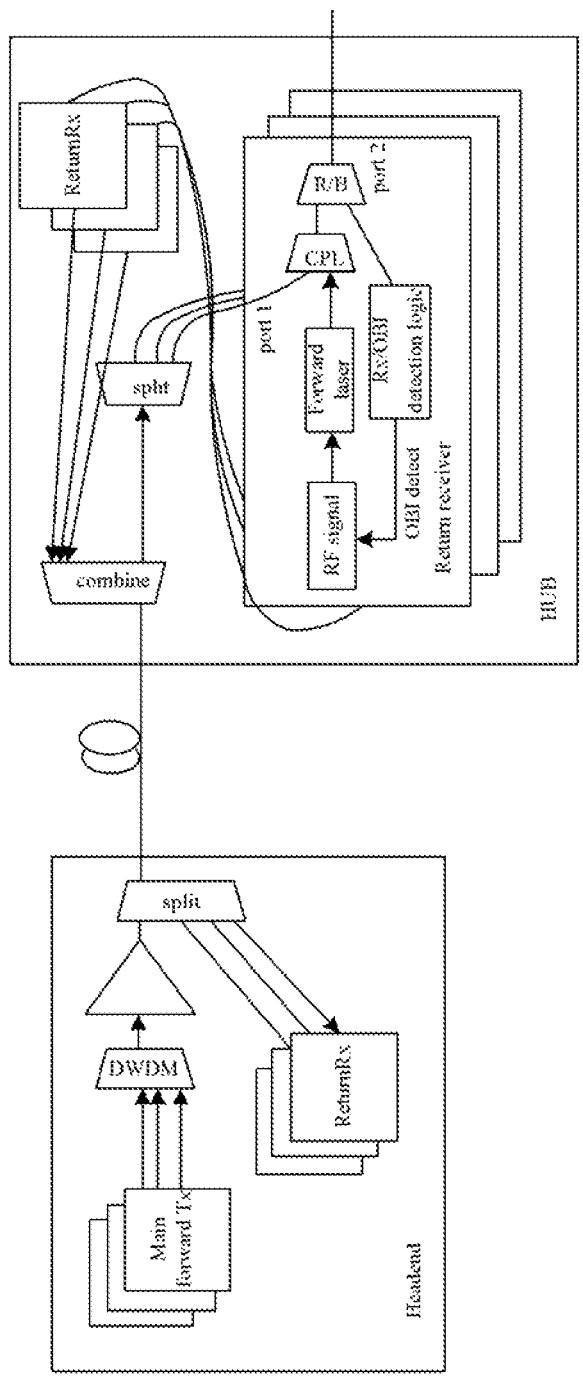
FIG. 17 illustrates an exemplary RFoG WDM system.
Figure 1S:
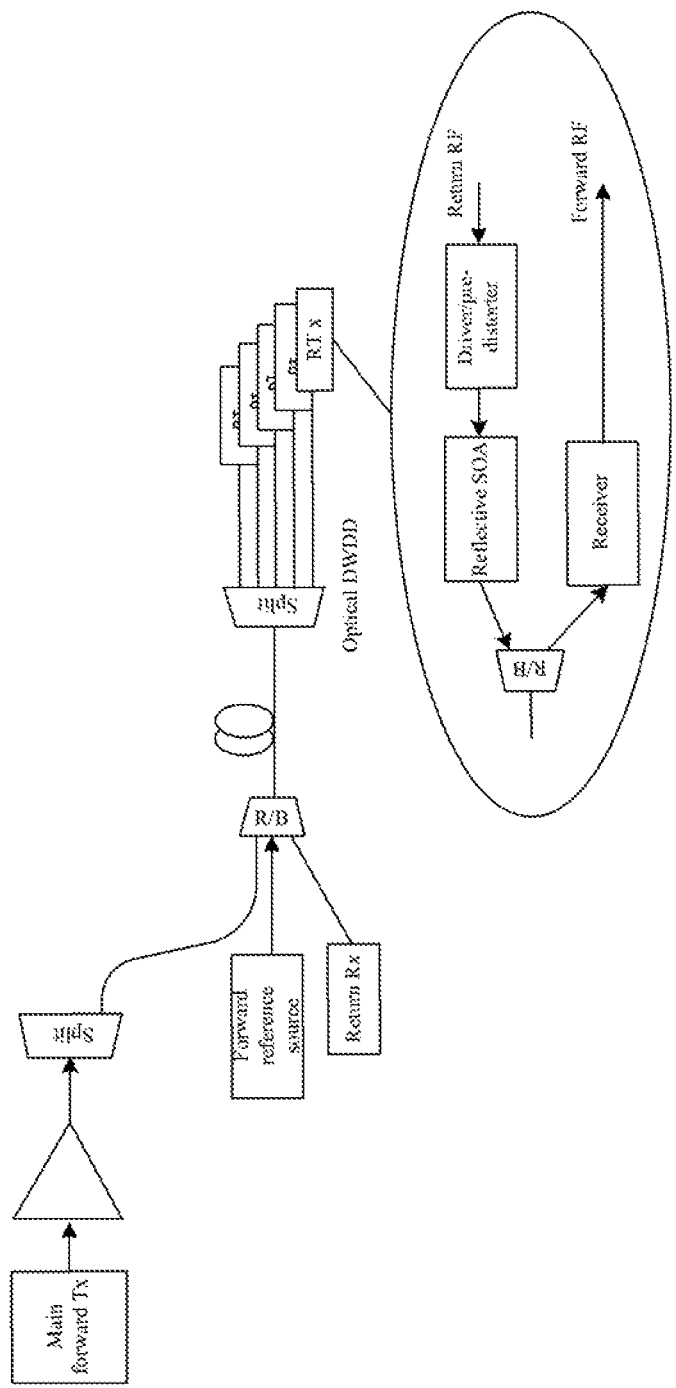

These techniques may also be applied to a WDM RFoG system as illustrated for example in FIG. 17. At a headend multiple forward transmitters provide signals to a WDM combiner; the signals are amplified and distributed to hubs that take one or more forward wavelengths and distribute these to end users. Optionally there may be optical amplification in the hubs. The return traffic is received in the hub and the output of the receivers is modulated and sent back to the headend on one or more WDM return transmitters. OBI within each group or within multiple groups may be managed by the receivers or by injecting a forward OBI detection signal at any other location in the forward path as discussed in the previous section.

Return Laser Spectrum Control

OBI may be prevented if each return transmitter is allocated a specific wavelength. This may be accomplished with DWDM DFB lasers, but is cost-prohibitive. An alternative is to set each return laser to cover a wide spectrum, so that OBI occurs but the resulting noise generated due to OBI is spread over a wide spectrum such that the impact on the RF spectrum is low. This may for instance be accomplished using wide-spectrum sources such as super-luminescent diodes (SLD). Another solution employs reflective SOA's at the locations of the return transmitters. Such SOA's require a seed signal as input and vary the degree of amplification to modulate the reflected return signal. The seed signal may be a broadband source, spreading the OBI signal spectrum like for SLDs. It may also be a broadband source that is provided to a DWDM filter that sends different slices of the spectrum to each return SOA such that each return signal is a slightly different optical frequency, and OBI is prevented altogether. A narrowband source may be employed, in which case various return signals are amplified versions of the same source. When they interfere (to create OBI) the interference signal is at a low frequency determined by the line-width of the narrowband source. Modulation with the SOA's adds amplitude modulation and phase modulation to the interfering signals such that the interference signal still possesses high frequency components. The low frequency interference signal may lead to fading of the received signal. If the seed signal is a pulsed signal and the pulses are short, the signals from the individual return transmitters are separated in time, unless their optical delay is identical. In most cases this temporal separation will prevent OBI. Application to analog signals is complicated by the non-linear response of SOA gain. An SOA is driven by a pre-distorted signal to compensate for non-linearity, and optionally a coupler with a feedback path is added to control the predistorter for optimum performance. See FIG. 18 for an illustration of an exemplary system with these features.

Optical Signal Combiner with Reduced Optical Beat Interference

In fiber-optic communication, a single-mode optical fiber (SMF) (monomode optical fiber, single-mode optical waveguide, or unimode fiber) is an optical fiber designed to carry only a single ray of light (mode). Modes are the possible solutions of Helmholtz equation for waves, which is obtained by combining Maxwell's equations and the boundary conditions. These modes define the way the wave travels through space, i.e. how the wave is distributed in space. Waves can have the same mode but have different frequencies. This is the case in single-mode fibers, where we can have waves with different frequencies, but of the same mode, which means that they are distributed in space in the same way, and that gives us a single ray of light. Although the ray travels parallel to the length of the fiber, it is often called transverse mode since its electromagnetic vibrations occur perpendicular (transverse) to the length of the fiber.

Multi-mode fiber has higher "light-gathering" capacity than single-mode optical fiber. In practical terms, a larger core size simplifies connections and also allows the use of lower-cost electronics such as light-emitting diodes (LEDs) and vertical-cavity surface-emitting lasers (VCSELs) which operate at the 850 nm and 1300 nm wavelength (single-mode fibers used in telecommunications operate at 1310 or 1550 nm and require more expensive laser sources. Single mode fibers exist for nearly all visible wavelengths of light). However, compared to single-mode fibers, the multi-mode fiber bandwidth-distance product limit is lower. Because multi-mode fiber has a larger core-size than single-mode fiber, it supports more than one propagation mode; hence it is limited by modal dispersion, while single mode is not. The LED light sources sometimes used with multi-mode fiber produce a range of wavelengths and these each propagate at different speeds. In contrast, the lasers used to drive single-mode fibers produce coherent light of a single wavelength. This chromatic dispersion is another limit to the useful length for multi-mode fiber optic cable. Because of their larger core size, multi-mode fibers have higher numerical apertures which means they are better at collecting light than single-mode fibers. Due to the modal dispersion in the fiber, multi-mode fiber has higher pulse spreading rates than single mode fiber, limiting multi-mode fiber's information transmission capacity.

Figure 19:
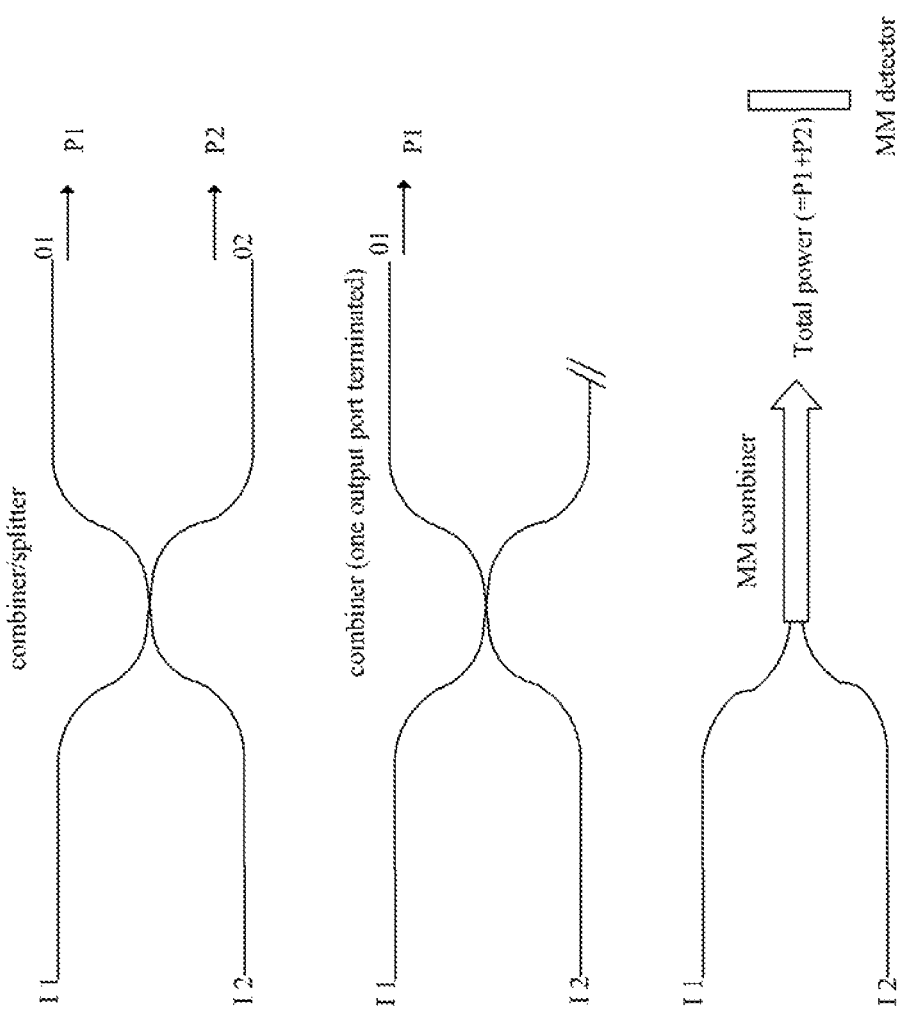
FIG. 19 illustrates an exemplary multimode coupler that may be used to combine multiple single mode fiber inputs with optical frequencies sufficiently close that optical beat interference could occur.

Optical signals may be combined on single mode fibers using couplers as shown in the top two combiners in FIG. 19. A typical single mode coupler that combines two inputs has a loss of around 3 dB. This loss is fundamental to such couplers and arises from the fact that such a coupler may be considered to have two output arms. Power is coupled to each output arm; the electrical field of the optical signal in output arms O1 and O2 can be described by a simplified formula:

$$O1(t)=I1(t)+I2(t-dt)$$

$$O2(t)=I1(t)-I2(t-dt)$$

where I1 and I2 are the input signal electrical fields. Usually I1 and I2 are at different angular frequencies w1 and w2 respectively and have different amplitudes A1 and A2 respectively. The optical fields have phase noise n1(t) and n2(t) respectively.

$$I1(t)=A1(t)*\cos(w1*t+n1(t))$$

$$I2(t)=A2(t)*\cos(w2*t+n2(t))$$

The output fields of the coupler arms then are:

$$O1(t)=A1(t)*\cos(w1*t+n1(t))+A2(t)*\cos(w2*t+n2(t))$$

$$O2(t)=A1(t)*\cos(w1*t+n1(t))-A2(t)*\cos(w2*t+n2(t))$$

When measuring the output powers P1 and P2 of the arms with a detector, the following result is obtained for O1:

$$P1(t)=O1(t)^2=(A1(t)*\cos(w1*t+n1(t))+A2(t)*\cos(w2*t+n2(t)))^2=A1(t)^2*\cos(w1*t+n1(t))^2+2*A1(t)*A2(t)*\cos(w1*t+n1(t))*A2(t)*\cos(w2*t+n2(t))+A2(t)^2*\cos(w2*t+n2(t))^2=A1(t)^2*(0.5+0.5*\cos(2*(w1*t+n1(t))))+A2(t)^2*(0.5+0.5*\cos(2*(w2*t+n2(t))))+A1(t)*A2(t)*[\cos(w1*t+n1(t)+w2*t+n2(t))+\cos(w1*t+n1(t)-w2*t-n2(t))]$$

RF detectors have a limited RF response. In many practical CATV systems this response is on the order of 1 GHz. The optical frequencies may be in the 100 THz range, so that the terms with 2w1, 2w2 or w1+w2 angular frequencies do not result in a detectable current. The result can thus be simplified to:

$$P1(t)=0.5*[A1(t)^2+A2(t)^2]+A1(t)*A2(t)*\cos(w1*t+n1(t)-w2*t-n2(t))$$

The first two terms represent the input powers to the coupler that are added up and divided by 2 (the 3 dB loss). The last term results from the interaction of the optical fields of the two inputs. In many cases the optical frequencies of the two inputs differ by more than 1 GHz. In this case the third term will not result in a detectable photocurrent. In some cases however the optical frequencies are very close, such that the third term results in a detector signal at the difference frequencies that is well within the range of normal RF frequencies. In return systems, for instance, this is frequencies below 50 MHz. In these situations the detector output comprises the wanted addition of the two inputs, plus an additional strong signal due to the interaction of the two inputs.

If the inputs had no phase noise (n1=0, n2=0), this additional signal would be a tone at angular frequency w1-w2. In practice, optical sources have a significant phase noise such that the additional signal is a noise band around a center frequency w1-w2. If the frequency range of this unwanted signal band overlaps with wanted signals, the signal to noise ratio of the wanted signal may be severely impacted by OBI.

If the input signals are detected separately, the interaction term does not exist and there is no optical beat interference. Input power per optical signal in this case is a factor of two higher, potentially resulting in better signal to noise performance. Separate detection involves one detector and subsequent amplifier circuit per input, and thus can be costly for a large number of inputs.

The signal out of a detector at the second output is given by:

$$P2(t)=0.5*[A1(t)^2+A2(t)^2]-A1(t)*A2(t)*\cos(w1*t+n1(t)-w2*t-n2(t))$$

This is nearly the same expression as for the signal out of the first output detector, except for the sign difference in front of the unwanted term. Thus the sum of the detectors:

$$P1(t)+P2(t)=A1(t)^2+A2(t)^2$$

has the full signal power and is free of optical beat interference. A detector could be provided at each coupler output arm to avoid the optical beat interference, but that would again be costly. The reason that the sum of the outputs of the coupler is free of optical beat interference is that every photon that enters the coupler will exit it on one of the two arms. When the output photons of both arms are counted (same as measuring the output power of both arms) the total measured power becomes the sum of the input powers. Vice versa, the inherent 3 dB loss of the single mode optical coupler enables optical beat interference in the first place when, as usual, only one output is used.

Multi mode couplers differ from single mode couplers in that they combine multiple input signals with a very low loss. Multimode couplers excite different output modes in the output arm of the coupler for each optical input signal (something that is not possible in a single mode device that can only output power in a single mode per arm). Light may be coupled from single mode to multimode fibers with a low loss; the single mode input will excite a matched mode pattern in the multimode waveguide. However, coupling light from a multimode fiber back into a single mode fiber is difficult, because only one of many possible modal patterns couples well with the single mode fiber. A system with multiple single mode fiber inputs each carrying an optical signal may be converted to a multimode signal, and with a multimode coupler be provided to a multimode output. Due to the low loss in this conversion process any optical beat interference is usually low.

In another formulation; the different inputs excite different modal patterns in the multimode output that do not mutually interfere. If the output of the multimode fiber is coupled to a photo detector, the detector measures the sum of all input powers without optical beat interference as long as the detector is large enough to capture the complete output beam of the multimode fiber. Typical multimode fibers have core diameters in the order of 50-80 um. Typical detector diameters for GHz range detectors are on the order of 50 um. Lower frequency detectors can be larger, for instance for systems with response up to 50 or 100 MHz.

FIG. 19 illustrates a multimode coupler that may be used to combine multiple single mode fiber inputs with optical frequencies sufficiently close that optical beat interference could occur. This results in suppressed optical beat interference and low loss for the individual inputs. The coupler output is provided to a multimode detector and amplifier to recover RF signals.

Many multimode (MM) couplers are not lossless, so not every MM coupler will prevent OBI. However MM couplers do exist that are lossless in principle and these may be utilized as a MM coupler that prevents OBI.

In one embodiment, a headend has multiple outgoing fibers, each fiber providing a return signal to the headend, and these return signals need to be combined before being applied to an optical receiver. The use of a single mode (SM) combiner causes OBI. The use of a MM coupler may reduce or prevent OBI. Alternately, a detector may be used with multiple SM inputs that are imaged on a MM detector, for instance using different beam angles.

In another application, an RFoG system utilizes a single mode fiber running from a headend to a node; from the node the signals are distributed to the end user devices over relatively short links (e.g. less than half the link distance from the headend to the node). Distribution may be done with MM fiber and MM couplers. MM fiber cannot support the distribution of forward signals over long distances, but on short drops it can be adequate. Return signals are injected into the MM fibers and get combined by the same coupler that distributes the forward signal. For a coupler of the right type this combination may be low-loss while the forward split may distribute power evenly over the output ports. The low loss combiner is OBI free and the combined return signal is detected after the combiner.

In another application, an RFoG system comprises a headend and a first split into N output fibers that are then split in N nodes into a number (for instance M) of output fibers per node. At each node the M outgoing fibers carry forward and return traffic. The return traffic is extracted off each of the M fibers and combined in a MM coupler connected to a MM fiber. The MM fiber is then coupled to a MM detector. Alternately, the MM coupler has an integrated MM detector. The detector output is amplified and provided to a laser that sends the return traffic back to the headend.

The transmission back to the headend may be on a separate fiber which may be SM or MM, or it may be on the headend to node fiber that carries the forward traffic. In case the fiber back to the headend is a separate MM fiber, it may also be coupled to the MM coupler in the node (such that detection and re-transmission is not needed). A MM detector (or further MM couplers) may then be used in the headend. In case the fiber back to the headend is SM (a separate SM fiber or shared with the SM fiber from the headend) the return laser transmission into that fiber may use a WDM laser (CWDM or DWDM) such that the return transmission from each node is at a different wavelength. This allows combination of the N return signals at the headend in the optical domain without OBI.

If a first broadband source is used with a bandwidth of several 100 GHz, the first broadband source may be combined with a second broadband source in a coupler. OBI will occur at the coupler output. However, due to the large bandwidth of the sources the OBI will be spread over several 100 GHz to a few THz. The amount of OBI noise that can thus fall into an RF channel of 4 MHz width is reduced by a factor on the order of 4 MHz/1 THz or $10*\log(4*10^{-6})$ dB (54 dB).

Thus the impact of OBI is effectively eliminated. A broadband source may be generated for instance with the use of optical amplifiers and optical filters. With an optical splitter the output of the broadband source may be distributed over a number of output fibers that are terminated in receivers with reflective amplifiers. Modulation of the gain of the reflective amplifiers modulates the reflected light intensity of the broadband source. The reflective amplifier outputs are thus combined by the same splitter that was used to distribute the broadband source output. The combined return signal from the splitter will suffer from OBI but this OBI is spread out over such a wide frequency range that it does no longer significantly affect the performance of the system.

Bias Overshoot For Pre-Steady State Laser

Lasers used in RFoG applications are generally either 1310 or 1610 uncooled DFB lasers. The wavelength of such lasers may shift at the rate of approximately 0.1 nm/C. When a DFB laser is turned on, because of the presence of the RF at its input according to the DOCSIS/RFoG turn on/turn off algorithm, the laser begins at the ambient temperature and takes some amount of time until it reaches its steady state temperature subject to the mass of the laser chip and its holding mechanism. During the time that the laser is achieving its steady state temperature, assuming the laser is turned on for the duration of this time, the laser wavelength is continually moving.

EXAMPLE: As an example if the ambient temperature were 0C and the steady state temperature of the laser happened to be 25C, the temperature moves thru 25C which is a consequent movement of 2.5 nm of the laser wavelength. This substantial movement of the laser wavelength causes the laser to OBI with other lasers that are turned on at the same time and results in a more substantial OBI effect. OBI occurs when the two or more wavelengths are within 0.0125 nm of each other.

Let the temperature coefficient of the laser be represented by xx. Typically xx is on the order of 0.08 nm/degree C. The power dissipated in the laser is a function of current. To a first approximation it is linear in the laser current and the power is Pdiss=yy*Ilaser. Typically yy is on the order of 2V (Ilaser in A, Pdiss in Watt).

The thermal resistance of a laser chip mounted in a package to a first approximation is zz (typically zz=100 K/W). The steady state temperature increase of a laser due to current is deltaT_steady=Pdiss*zz=yy*zz*Ilaser and the steady state wavelength shift is delta_lambda_steady=xx*yy*zz*Ilaser. Due to the effective thermal mass of the chip this wavelength shift is not reached instantaneously after turn on. The steady state condition is approached with a function: delat_lambda(t)=delta_lambda_steady*f(t) where f(t) is typically an exponential-like function such as f(t)=1-exp(-t/tau) with tau on the order of 1-10 usec. When Ilaser is not constant the relation is more complicated. During a time period that Ilaser is set higher than steady state the temperature rise and thus the wavelength shift is accelerated.

The laser's bias current be "overshot" and depleted to normal levels to speed up the process of laser temperature change and by extension the wavelength. During the overshoot the steady state described above is reached. For the duration of the overshoot, even though the bias current and by extension the output power of the laser and by extension the input power to the receiver has increased, since the RF level going to the laser is helped constant, there is a consequent decrease in the laser OMI. This lower OMI is in proportion to the increase in received optical power and therefore has the effect of maintaining the RF level at the receiver hinged to a constant value.

The back facet photodiode monitor of the laser is a pn junction device when it is not reverse biased as indeed any photodiode is when not biased similarly. Therefore when this back facet monitor is observed without the reverse bias, it provides an accurate estimation of temperature inside the laser chamber, providing a measure of the temperature inside the laser chamber even though the RFoG lasers traditional would not have a thermistor.

A map of the steady state temperature of each laser may be created by polling the back facet monitor of each laser in the RFoG set. With an appropriate overshoot or undershooting of the bias current as the case maybe, there is further reduction in the OBI.

Implementations and Alternatives

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A first end user device in one or more of groups of end user devices in a two way optical communication path, the first end user device having a wavelength for return signal transmission that is variable to reduce optical beat interference (OBI) with a second end user device in one or more of the groups of end user devices, the first end user device comprising:
   a wavelength shifter for causing a shift in a wavelength of a return signal; and
   at least one return transmitter for transmitting return signals from said first end user device at return wavelengths, the return transmitter including logic for determining whether to cause a wavelength shift of the first end user device wavelength of one or more return signals, wherein the wavelength shifter causes a shift to the first end user device wavelength in accordance with at least one of:
      generating a different wavelength from a prior first end user wavelength when the first end user devices turns on, and/or
      continuously varying the first end user device wavelength while the first end user device is at rest or while bursting.

2. The system of claim 1, further comprising monitoring a spectrum of the return signals from each group of end users.

3. The system of claim 1, further comprising determining from the monitored spectrum of return signals if an OBI event has occurred for each respective group of end user devices and triggering a high squelch event in case an OBI event has occurred.

4. The system of claim 1, further comprising a low squelch activator for triggering low squelch when a combined signal power at a respective return receiver indicates a quiescence state for each of the end user devices in a respective one of the at least one return receiver's group of end user devices.

5. The system of claim 1, further comprising determining whether an OBI event has occurred by monitoring power outside of a predetermined signal frequency band.

6. The system of claim 5, further comprising determining whether an OBI event has occurred by whether the power outside of the predetermined signal frequency band exceeds a predetermined threshold.

7. The system of claim 1, wherein the processor monitors the return signals by monitoring an average radio frequency (RF) power and an optical power of the return signals, and detects an OBI event based on an average RF power exceeding the optical power level.

8. The system of claim 1, wherein return signals from each group of end user devices are combined, and communications from each group in the reverse direction are combined and provided to a return receiver designated for the group.

9. A method for communicating over a two way optical path having at least one of a headend or a node, the method comprising:
- detecting an optical beat interference (OBI) occurrence between a first end user device and a second end user device in one or more groups of end user devices communicating over the two way optical path;
- determining whether to cause a wavelength shift of a first end user device wavelength, the first end user device having a wavelength for return signal transmission that is variable to reduce optical beat interference (OBI) with another end user device in the one or more groups of end user devices;
- varying the first end user device wavelength in one or more of the groups of end user devices to reduce optical beat interference with the second end user device in one or more of the groups of end user devices;
- transmitting the return signals at return wavelengths;
- generating a different wavelength from a prior first end user wavelength when the end user devices turns on, and/or continuously varying the first end user device wavelength while the first end user device is at rest or while bursting.

10. The method of claim 9, further comprising monitoring a spectrum of the return signals from each group of end users.

11. The method of claim 9, further comprising determining from the monitored spectrum of return signals if an OBI event has occurred for each respective group of end user devices and triggering a high squelch event in case an OBI event has occurred.

12. The method of claim 9, further comprising triggering low squelch when a combined signal power at a respective return receiver indicates a quiescence state for each of the end user devices in a respective one of the at least one return receiver's group of end user devices.

13. The method of claim 9, further comprising determining whether an OBI event has occurred by monitoring power outside of a predetermined signal frequency band.

14. The method of claim 13, further comprising determining whether an OBI event has occurred by whether the power outside of the predetermined signal frequency band exceeds a predetermined threshold.

15. The method of claim 9, further comprising monitoring the return signals by monitoring an average radio frequency (RF) power and an optical power of the return signals, and detects an OBI event based on an average RF power exceeding the optical power level.

16. The method of claim 9, wherein return signals from each group of end user devices are combined, and communications from each group in the reverse direction are combined and provided to a return receiver designated for the group.

* * * * *